Nov. 19, 1946.   L. B. STANTS   2,411,473
MECHANISM FOR APPLYING BALE TIES
Filed March 21, 1944   2 Sheets-Sheet 2
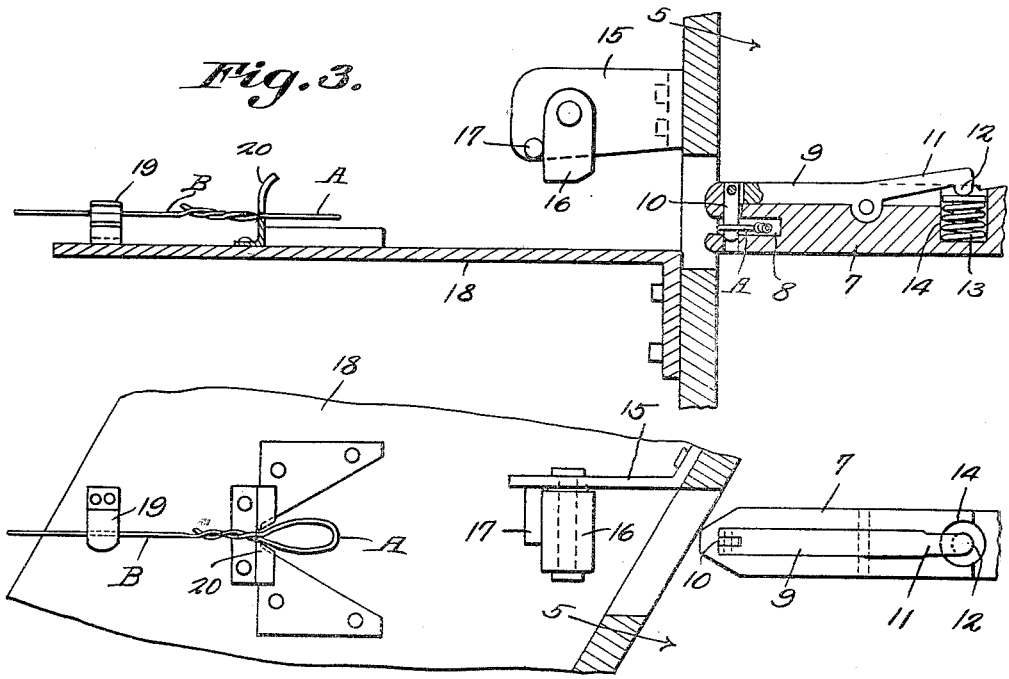
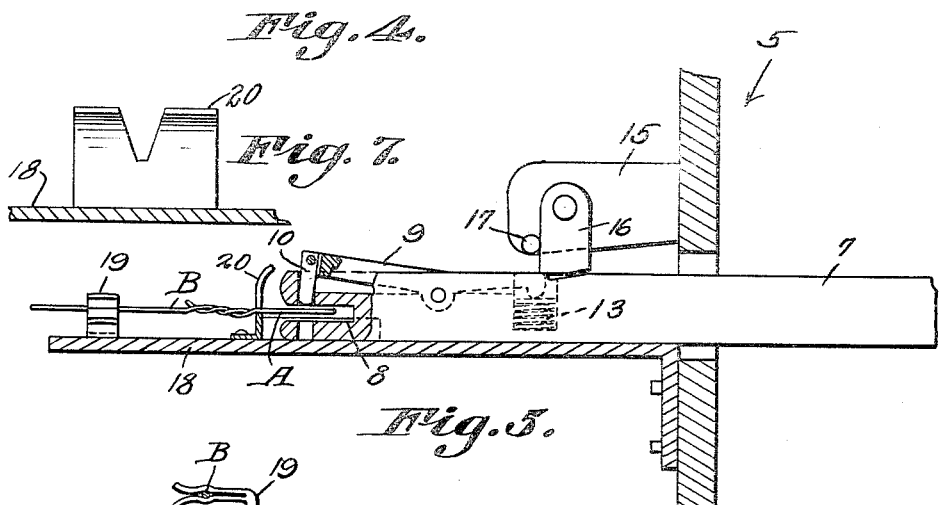
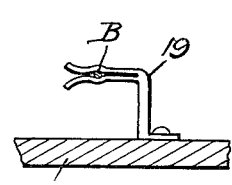
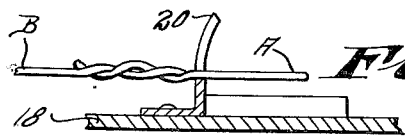
L. B. Stants
INVENTOR.
BY Knowles,
ATTORNEYS.

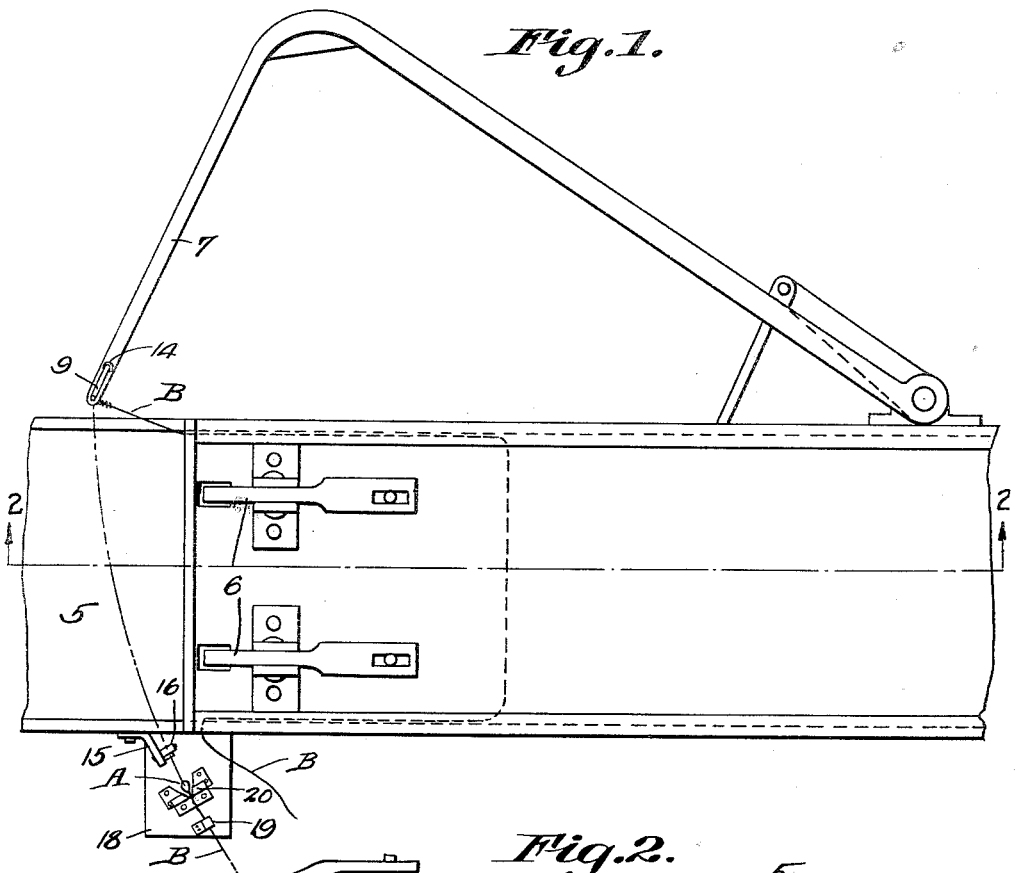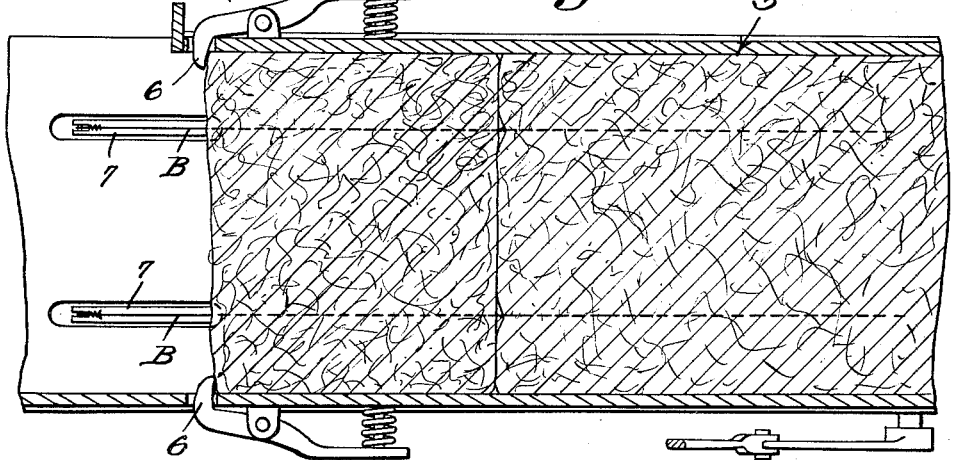

Patented Nov. 19, 1946

2,411,473

UNITED STATES PATENT OFFICE 2,411,473

MECHANISM FOR APPLYING BALE TIES

Levi B. Stants, Abilene, Kans.

Application March 21, 1944, Serial No. 527,467

6 Claims. (Cl. 100—20)

This invention relates to mechanism particularly designed for use in connection with standard hay presses or balers, wherein prepared standard bale ties are used, and which are usually placed around bales by hand.

It is therefore the primary object of the invention to provide mechanical means, whereby standard bale ties having eyes formed at one of their respective ends, may be placed around a quantity of material pressed into bale form, during the baling operation.

Another object of the invention is to provide a mechanism of this character which may be readily installed on baling machines, eliminating the necessity of making extensive alterations in the baling machine construction to mount the mechanism.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a plan view of a baler equipped with a tie-handling mechanism, constructed in accordance with the invention.

Figure 2 is a vertical sectional view through the bale chamber of a baler, taken on line 2—2 of Figure 1.

Figure 3 is a fragmental sectional elevational view illustrating the needle of the mechanism as moving towards the eye of the tie to be moved through the bale chamber.

Figure 4 is a plan view thereof.

Figure 5 is a fragmental sectional elevational view illustrating the position of the needle prior to engaging the bale tie.

Figure 6 is a view illustrating the tie wire guide 19.

Figure 7 is a front elevational view of the guide 20.

Figure 8 is a central vertical sectional view of the guide.

Referring to the drawings in detail, the bale chamber of a baling machine is indicated generally by the reference character 5 and as shown, is provided with the usual dogs 6 that engage the material being baled, to hold the material while the wire ties are being applied thereto.

The side walls of the bale chamber are formed with slots through which the needles 7 extend, the needles being actuated by the usual needle-operating mechanism such as shown and described in the patent, No. 1,062,243.

The number of needles employed in a baling press will of course be regulated, according to the work to be accomplished. However, each needle is formed with a slot 8 in its forward end, to accommodate the eye of the bale tie, the eye in the present showing being indicated by the reference letter A.

The reference character 9 designates a pivoted eye-engaging arm which is formed with a pivoted pin 10 that extends vertically through the slot 8 to pass into the eye of the bale tie, when the needle moves to a position directly over the eye of the bale tie, as shown by Fig. 5 of the drawings.

The end 11 of the arm 9 extends upwardly at an oblique angle with respect to the needle, and is provided with a lug 12 depending from the extremity thereof, the lug 12 being designed to engage the coiled spring 13 mounted in the recess 14 of the needle, to normally cause the forward end of the arm 9 to lie in the position as shown by Fig. 3 of the drawings.

Secured to one of the side walls of the bale chamber 5, is a bracket 15 which extends outwardly therefrom, the bracket 15 providing a support for the pivoted member 16 that normally rests against the stop 17, mounted on the bracket 15, so that pivotal movement of the member 16 is restricted, in one direction.

The bracket 15 is arranged directly above the needle opening in the wall of the bale chamber, so that as the needle moves through the opening to pick up the bale tie, the arm 9 will be moved by its contact with the pivoted member 16, to cause the pin 10 to move upwardly, to the position as shown by Fig. 5.

Mounted on the outer surface of the side wall of the bale chamber, directly under the bracket 15, is a wide supporting plate 18 on which the guide 19 is mounted, the guide 19 embodying a pair of yieldable arms, which grip the tie wire, indicated by the reference character B, holding the tie wire against displacement, under normal conditions.

Associated with the guide 19, is a guide 20 in which the bale tie is positioned so that the eye thereof will be aligned with the needle which moves through the bale chamber.

In the use of the device, the prepared ties or wires, which are of predetermined lengths and provided with eyes formed at one of their respective ends, are positioned one at a time so that the eyes rest within the guide 20, as shown by Fig. 5 of the drawings. The eye of the tie is firmly held in its proper position, within the guide 20. The needle now moves through the bale chamber, and as the needle advances towards the eye, the arm 9 is pivoted so that the pin 10 thereof is elevated to the position as shown by Fig. 5. Upon further movement of the needle towards the eye, the arm passes from under the member 16, with the result that the coiled spring 13 moves the arm to cause the pin 10 to engage within the eye of the tie wire. On return movement of the needle, the tie wire is drawn across the bale chamber, directly in the path of travel of the material being pressed within the bale chamber. The mechanism is so timed that when the desired quantity of material has been pressed into the bale chamber to form a bale, the needle returns through the bale chamber, carrying the tie wire over the face of the bale. As the needle moves under the pivoted member 16, the arm 9 is moved, disengaging the pin 10 and eye of the tie. The ends of the tie may now be secured together, to hold the material in bale form. It will of course be understood that it is contemplated to position the bale ties by hand, and to form twists or knots in the ends of the ties to secure the ends together.

When a bale tie has been released, the needle is in a position to pick up another bale tie and carry it through the bale chamber in a manner as described, to secure the material in bale form.

What is claimed is:

1. The combination with a bale chamber having openings in the side walls thereof through which a bale tie needle operates, of a bale tie supporting means disposed adjacent to one of said openings, a needle movable through the openings in the bale chamber, and means on the free end of the needle for engaging one end of a bale tie held in the bale tie supporting means, whereby the bale tie is moved through the bale chamber with the needle, and positioned in the path of travel of the bale moving through the bale chamber.

2. The combination with a bale chamber having openings in the side walls thereof through which a bale tie needle operates, of a bale tie supporting means disposed adjacent to one of said openings, for holding the eye of a bale tie in the path of travel of the needle, and means on the needle adapted to pass into the eye of the bale tie, securing the bale tie to the needle.

3. The combination with a bale chamber having openings in the side walls thereof through which a bale tie needle operates, of a bale tie supporting means disposed adjacent to one of said openings and comprising guides in which a bale tie having an eye at one end, is held, a needle adapted to operate through the openings, a pivoted arm on the needle, a pin carried at the outer end of the arm and adapted to extend into the eye of the bale tie held within the guides, means for moving said arm and pin disengaging the tie wire at predetermined intervals, and said needle adapted to move the tie wire to a position within the bale chamber to engage a bale formed in the bale chamber.

4. The combination with a bale chamber having openings in the side walls thereof through which a bale tie needle operates, of a bale tie support embodying guide members adapted to clamp a bale tie having an eye formed at one end thereof, a needle adapted to move through the openings of the bale chamber in a line with the bale tie, a pivoted member on the needle adapted to extend into the eye of the tie wire, securing the tie wire to the needle, and said needle adapted to move the tie wire to a position across the bale chamber in the path of travel of baled material, whereby the tie wire is positioned around the baled material.

5. The combination with a bale chamber having openings in the side walls thereof, of a bale tie supporting means disposed adjacent to one of the openings, guide members on the bale tie supporting means and adapted to support a bale tie having an eye at one end thereof, a needle adapted to move through the openings of the bale chamber, and means on the needle adapted to engage within the eye of the tie wire, connecting the tie wire with the needle, whereby said needle moves the tie wire to a position across the bale chamber for engagement with the bale formed in the chamber.

6. The combination with a bale chamber having aligning openings in the side walls thereof, of a needle adapted to operate through said openings, a bale tie wire support mounted on the bale chamber adjacent to one of the openings, guides on the tie wire support and adapted to hold the eye of a bale tie wire in the path of travel of said needle, a pivoted latch member on the needle adapted to engage the eye of the bale tie wire, securing the bale tie wire to the needle, and means for actuating the latch member on the passage of the needle through said one of the openings of the bale chamber.

LEVI B. STANTS.